United States Patent [19]

Miffre

[11] Patent Number: 4,793,408

[45] Date of Patent: Dec. 27, 1988

[54] DEVICE FOR SEPARATING AND EXTRACTING COMPONENTS HAVING DIFFERENT DENSITIES FROM AN EFFLUENT

[75] Inventor: Hubert Miffre, Tourves, France

[73] Assignee: Societe Nationale Elf Aquitaine, Courbevoie, France

[21] Appl. No.: 90,362

[22] Filed: Aug. 28, 1987

[30] Foreign Application Priority Data

Aug. 29, 1986 [FR] France ................................ 86 12214
Aug. 29, 1986 [FR] France ................................ 86 12215

[51] Int. Cl.$^4$ ........................ E21B 43/34; E21B 43/40; E21B 43/38; B01D 17/032
[52] U.S. Cl. ..................................... 166/53; 166/105; 166/106; 166/265
[58] Field of Search ..................... 166/305.1, 369, 105, 166/106, 53, 65.1, 66, 68, 265

[56] References Cited

U.S. PATENT DOCUMENTS

| | | | |
|---|---|---|---|
| 2,281,801 | 5/1942 | Reynolds et al. | 405/128 X |
| 4,019,576 | 4/1977 | Finch | 166/369 X |
| 4,649,994 | 3/1987 | Chaudot | 166/369 X |

Primary Examiner—Stephen J. Novosad
Attorney, Agent, or Firm—Foley & Lardner, Schwartz, Jeffery, Schwaab, Mack, Blumenthal & Evans

[57] ABSTRACT

In a device for separating and extracting components having different densities from an effluent as applicable in particular to the separation of oil and water in crude oil, a single pump has the function of sucking the effluent into a separator and maintaining a pressure of higher value than the highest pressure which is necessary for extraction of one of the components. At least one regulator is provided for regulating the delivery of the lower-density component and at least one regulator is provided for regulating the delivery of the other component.

15 Claims, 6 Drawing Sheets

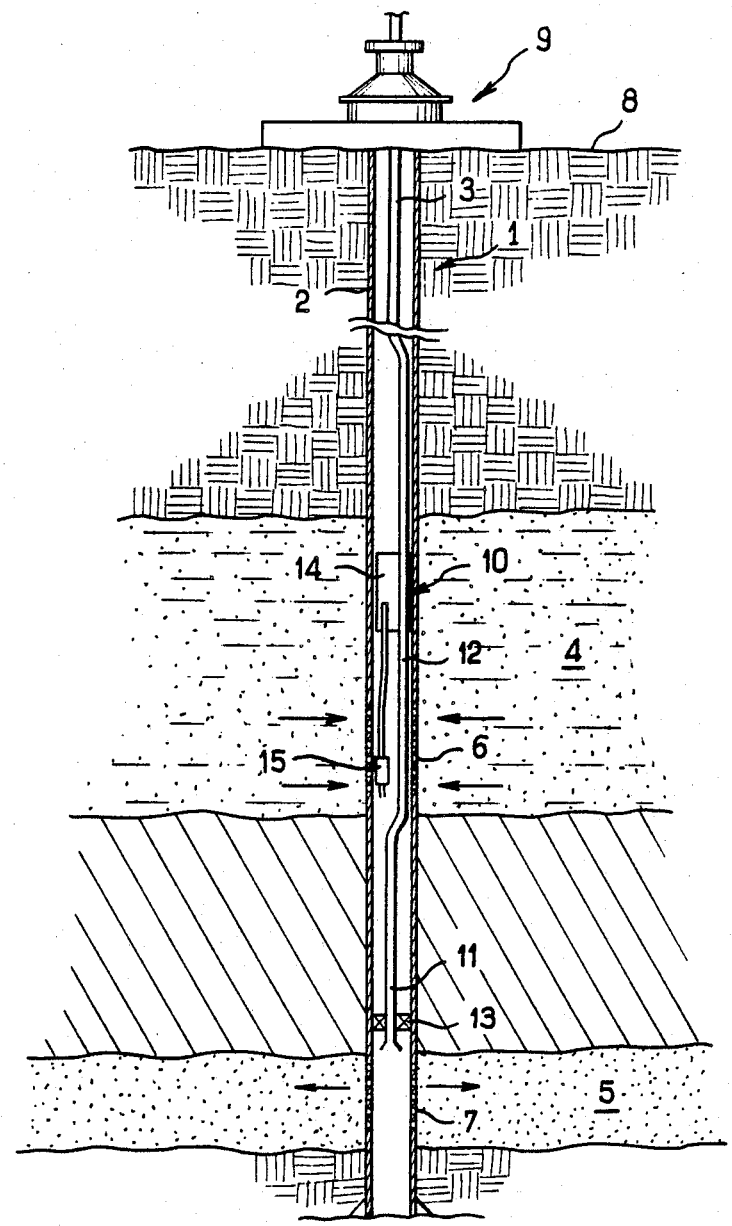
FIG_1

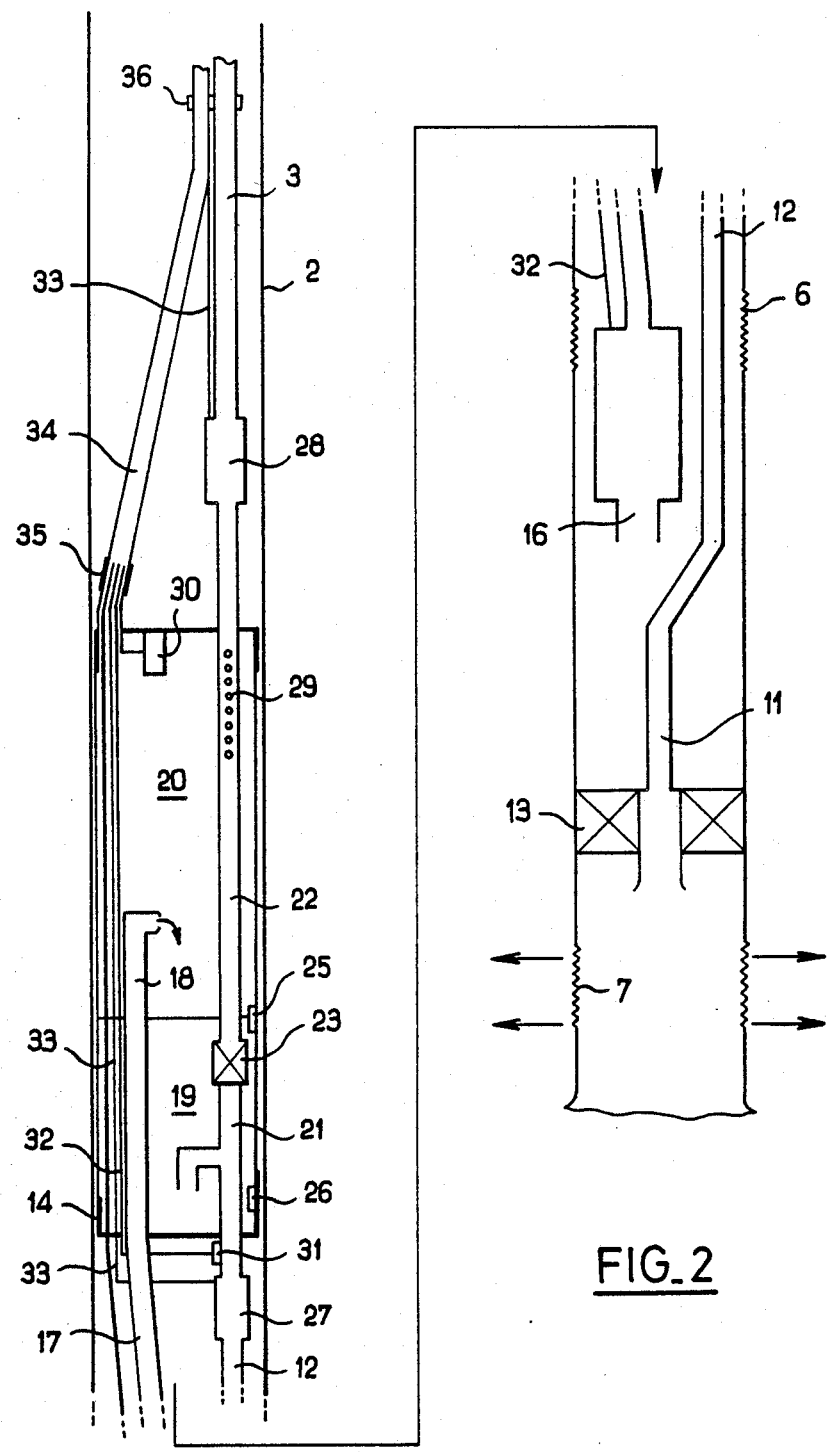
FIG_2

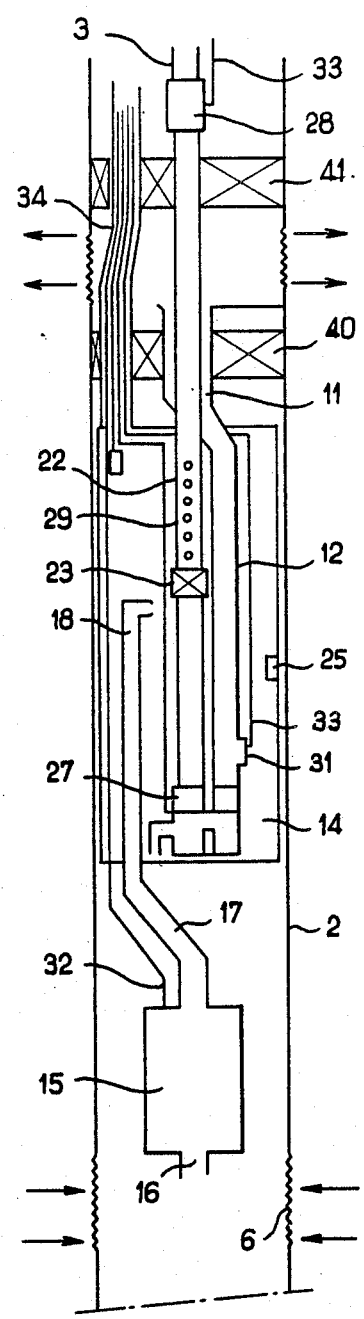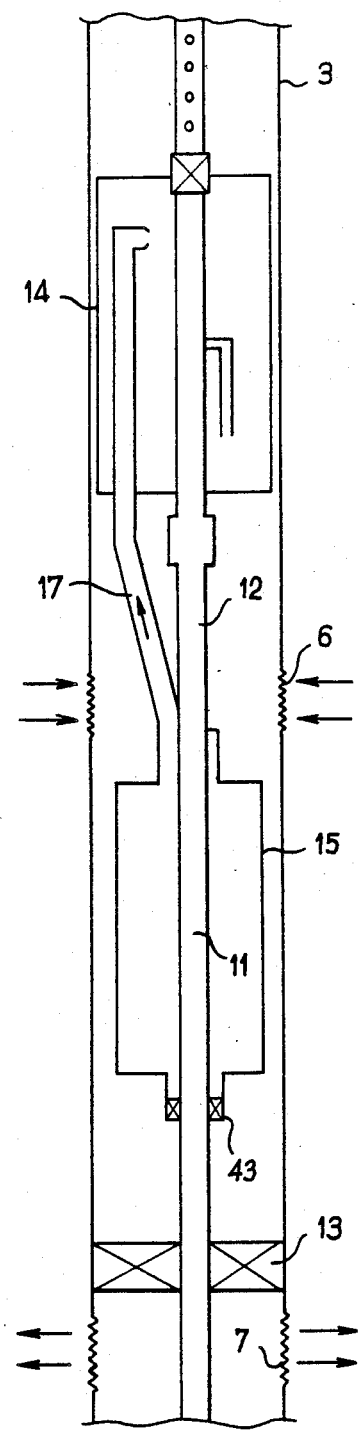
FIG_3　　　FIG_4

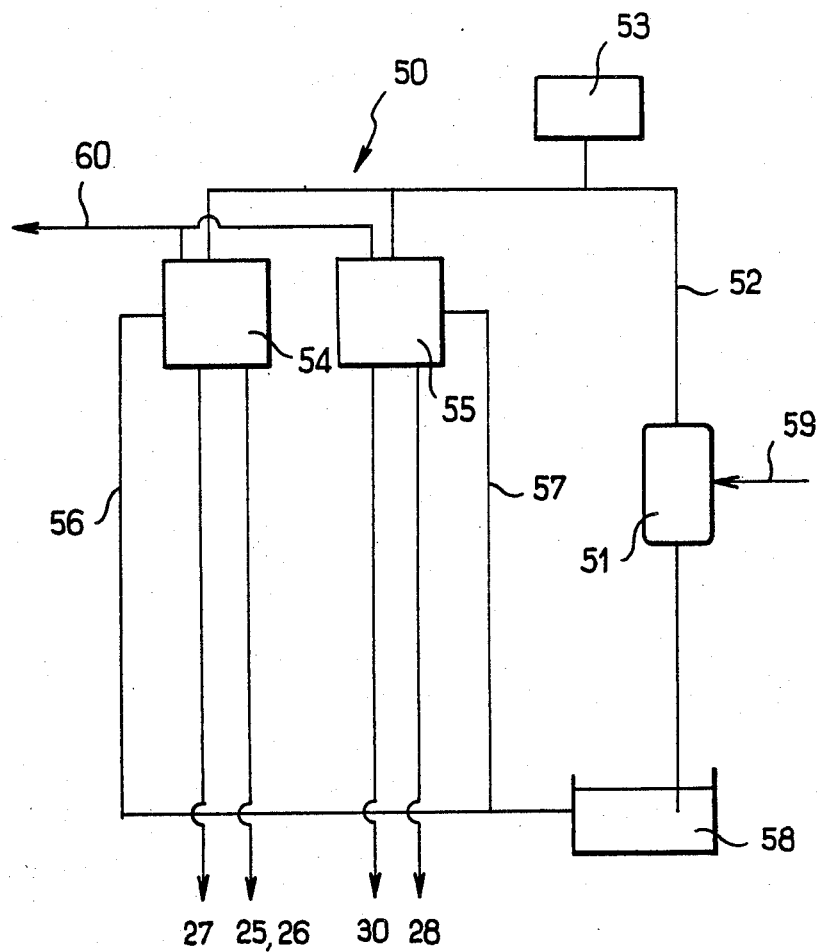
FIG_5

DEVICE FOR SEPARATING AND EXTRACTING COMPONENTS HAVING DIFFERENT DENSITIES FROM AN EFFLUENT

BACKGROUND OF THE INVENTION

1. Field of the Invention

The present invention relates to a device for separating and extracting components having different densities from an effluent and more particularly to a device for service in oil wells for the purpose of separating water from the crude oil constituting the major part of the effluent which penetrates into a wellbore.

2. Description of the Prior Art

Gas and/or oil wells extend through formations in which one or a number of productive formations contain not only oil or gas but also substantial quantities of undesirable products such as water (usually salt water). Such products are present in large quantities which may attain 90% of the effluent, especially towards the end of the productive life of a pay formation.

A number of different methods have been adopted for separating and extracting oil and/or gas from salt water.

A first method consists in extracting the entire quantity of effluent from the wellbore and separating the components at the ground surface by various means such as the gravity settling process. In this process, the oil and/or gas is recovered whilst the salt water is reinjected into a reinjection zone, in most cases through another wellbore.

A process of this type has been abandoned for economic reasons and also for technical reasons, due consideration being given to the energies which have to be produced in order to displace the effluent from the pay formation up to the surface prior to separation of oil and/or gas from the salt water.

A second known process consists in separating the oil and/or gas from the water beneath the ground surface so as to ensure that the oil alone is lifted to the surface, the water being reinjected into a formation around the wellbore and usually into a formation located above or below the productive horizon to be developed.

U.S. Pat. Nos. 4,241,787 and 4,296,810 relate to a process for extracting oil from a fluid effluent which contains both oil and water. This process consists in bringing the effluent from the formation into a separator located within the wellbore, in passing the effluent through a filter which is permeable to one of the components and placed within said separator, in maintaining a pressure gradient across the filter, then in pumping the separated oil on one side of the filter and in pumping the water on the other side of said filter in order to feed said water back into a reinjection zone.

The device for carrying out the process outlined in the foregoing includes two pumps mounted in parallel and driven from a single electric motor, pressurization of the effluent being carried out in response to the pressure developed within the formation and to the sucking action produced by all the pump sets through the separator.

However, these methods and devices entail the need to make use of a pump for each component of the effluent and also call for the use of a separator having a relatively complicated structure. The effluent is in fact required to pass through a first filtering material in order to remove solid particles such as grains of sand, for example, then through semipermeable membranes adapted to each component of the effluent. By reason of the specificity of membranes, however, it is preferable to employ a plurality of membranes for each component in order to guard against tearing of membranes under the action of the high pressures involved. The energy developed by the pumps must not only be of high value in order to overcome the resistance of the separator filters but must also be sufficient to lift the extracted oil to the surface and to discharge the salt water into the selected reinjection zone. Moreover, when the reinjection energy is too high, it is a recommended practice in such a case to lift the salt water also to the ground surface. Needless to say, this shows the limitations of such a device. Finally, it is not an easy matter to remedy any operational fault conditions which might arise in one of the pumps and more particularly the pump located at the lowest level since it is first necessary to lift the upper pump to the surface.

In the case of another known device as described in U.S. Pat. No. 3,167,125, separation of the effluent components is performed by gravity within the wellbore. Extraction of the heaviest component takes place through a sucker-rod pump which is capable of sucking said heavy component and of discharging it into a selected reinjection zone. The lighter component is displaced up to the surface solely under the action of the pressure existing within the producing formation. However, when the formation pressure is insufficient, it is necessary in such a case to make use of another pump for extracting said light component.

SUMMARY OF THE INVENTION

The present invention is primarily directed to a device which is capable of performing a separation in situ within the wellbore and of extracting the components from the effluent by means of a single pump, the lightest component being lifted to the surface and the heaviest component being reinjected into a predetermined reinjection zone.

The device in accordance with the invention is of the type comprising means for separating said components under the action of gravity, extraction means for withdrawal of the higher-density component, means for reinjecting the extracted component into a reinjection zone through perforations formed in the wellbore casing, and means for displacing the lower-density component up to a wellhead. The device is distinguished by the fact that the separating means are constituted by a closed-unit separator housed within the wellbore and that the device includes a single pump for sucking the effluent after admission into the casing and bringing said effluent into said separator within which the components of said effluent are separated under the action of gravity, the pressure maintained within said separator by said pump being higher than the highest value which is necessary for extracting one of the components. At least one regulator having the function of regulating the delivery of the lower-density component is mounted within an extraction pipe for withdrawal of said component and at least one regulator having the function of regulating the delivery of the other component is mounted within an extraction pipe for withdrawal of said other component.

One advantage of the present invention lies in the fact that a single pump is employed both for supplying the separator with effluent and for withdrawal of each component from said effluent, the delivery regulators mounted within the respective extraction pipes being intended to permit withdrawals of components when normal operating conditions are satisfied.

In accordance with another distinctive feature of the present invention, withdrawal of the heaviest component is carried out both below and above the pay formation or production zone.

In accordance with another distinctive feature of the present invention, the extraction pipes for withdrawal of components are constituted by a single pipe provided with means for separating the components from each other, said pipe being so arranged as to pass through the separator, thus taking up less space within the wellbore.

In accordance with another distinctive feature, the extraction pipe also passes through the pump in order to achieve a further reduction in bulk.

BRIEF DESCRIPTION OF THE DRAWINGS

FIG. 1 is a schematic sectional view of a wellbore in which the device in accordance with the invention is placed.

FIG. 2 is a schematic representation of the device within a portion of the wellbore.

FIG. 3 is a partial view representing a portion of the device for reinjecting one of the components into a reinjection zone located above the producing formation.

FIG. 4 is a schematic representation of an alternative embodiment of the device in accordance with the present invention.

FIG. 5 is a schematic layout diagram of a control unit.

DESCRIPTION OF THE PREFERRED EMBODIMENTS

Figure 6:
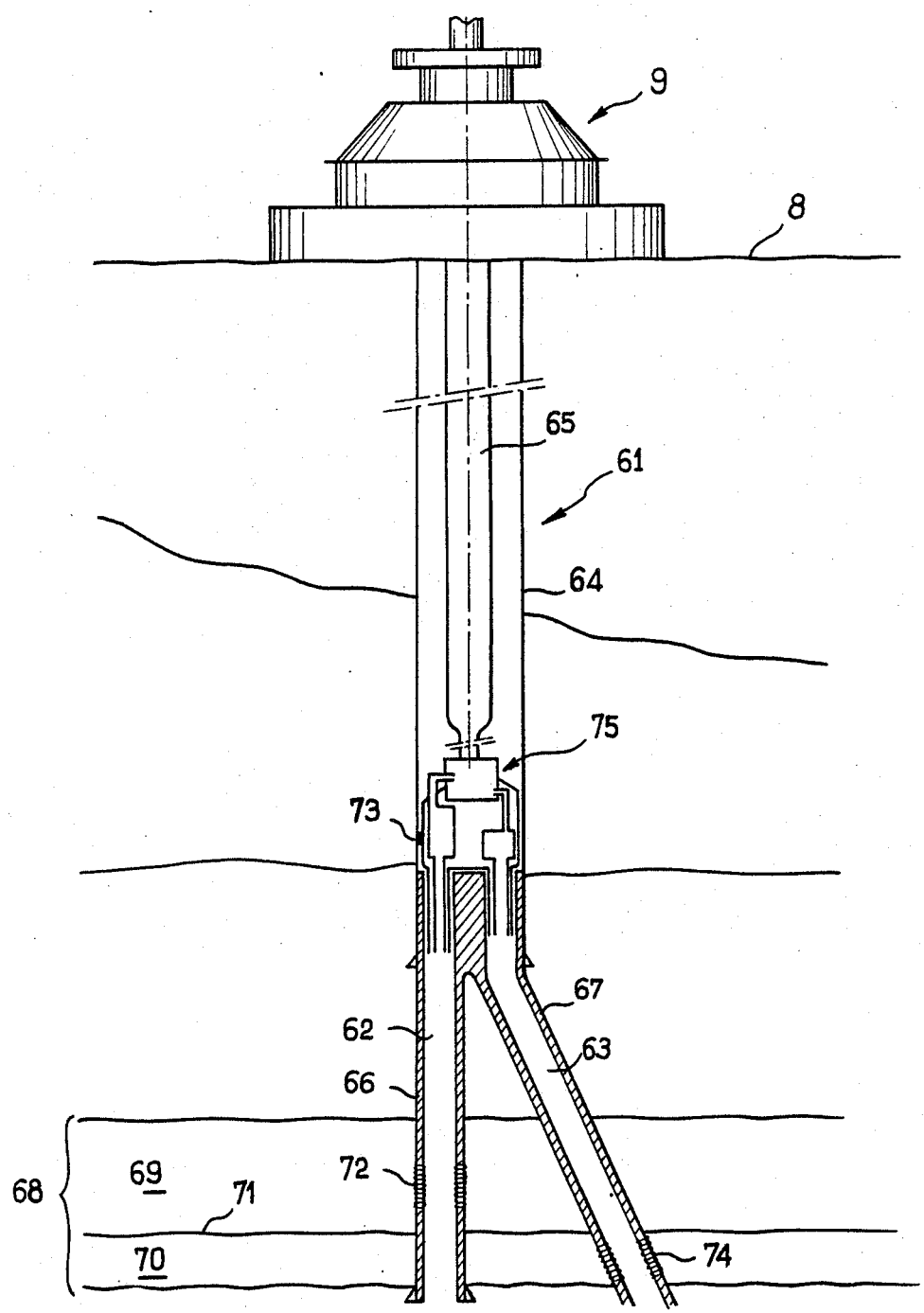
FIG. 6 is a schematic sectional view of a multiple-completion well having branch boreholes or so-called branch flow strings.

It will be understood that the terms "reinjection zone" and "production zone" as used throughout the following description have the following meanings:

reinjection zone: a subsurface formation zone in which the heaviest component (namely salt water in the case under consideration) is discharged to waste;

production zone: the producing horizon or pool of effluent to be developed, the main components of said effluent being petroleum hereafter designated as crude oil and salt water in proportions which may vary considerably from one producing horizon to another. It will be noted that the production zone can also be referred-to as a productive formation.

Referring now to the accompanying drawings and in particular to FIG. 1, a plurality of formations are traversed by a wellbore 1 which is drilled by means of known techniques. A casing string 2 is cemented in the wellbore 1 and is fitted with an internal production-tubing string 3 which is usually employed for lifting and removing the effluent. When the casing string 2 has been cemented in position, the casing is perforated at the level of the production zone 4 and reinjection zone 5, the positions and physical characteristics of which are determined by the known methods of drilling and/or well-logging.

The perforated section 6 within the production zone 4 enables the effluent contained in said zone 4 to flow into the casing 2 and the perforated section 7 within the reinjection zone makes it possible for the water which has been separated from the effluent in accordance with the present invention to be reinjected laterally into the reinjection zone 5.

Among the characteristics measured within the production zone 4 and reinjection zone 5 are those relating to the pressures developed within said zones so as to determine the energies which it is necessary to generate in order to lift the crude oil to a wellhead 9 which is anchored to the ground surface 8 and in order to reinject the water into the reinjection zone 5.

The device in accordance with the invention as generally designated by the reference numeral 10 is housed within the casing 2. The lower portion 11 of a water-removal pipe 12 extends down to the level of the perforated section 7. A packing seal 13 is mounted around said pipe portion 11 in order to isolate the perforated sections 6 and 7 with respect to each other.

The device 10 shown in FIG. 2 includes a separator 14 consisting of a closed chamber. An electric pump 15 sucks the effluent through an inlet pipe 16 and discharges said effluent under pressure into the separator 14 through a feed pipe 17 having an upper portion 18 which extends upwards to a predetermined height within the separator. The effluent is maintained under pressure within said separator 14. The components of the effluent are separated from each other under the action of gravity by reason of their different densities. The water 19, which is heavier, accumulates within the lower portion of the separator 14 and the crude oil 20, which is lighter, accumulates within the upper portion of the separator. The extraction pipes 21 and 22 for withdrawal of the water 19 and crude oil 20 are constituted by a single pipe which is located in the line of extension of the tubing string 3 and passes right through the separator 14. The water circulates within the downwardly directed portion of the tubing string 3 and the crude oil circulates within the upwardly directed portion of said tubing string. The extraction pipes 21, 22 respectively for withdrawal of water and crude oil are delimited by a plug 23 which can be withdrawn by means of a wire-line extractor. The tubing portion 21 is provided with a small water-suction pipe 24.

Two level detectors 25, 26 are mounted on the internal wall of the separator. The detector 25 detects the maximum level to be reached by the water within the separator 14 and controls the opening of a water discharge regulator 27 mounted within the tubing portion 21 outside the separator 14. The detector 26 detects the minimum level of water within the separator 14 and controls the closing of the regulator 27. An oil discharge regulator 28 is mounted within the portion 22 of the tubing string 3 outside and above the separator 14.

Perforations 29 are formed in the tubing portion 22 and permit the flow of crude oil 20 from the separator into said tubing portion 22.

An electronic detector 30 continuously detects the internal pressure within the separator 14 in order to produce a variation in energy delivered by the pump 15 as a function of the variations in pressure which are liable to appear during operation of the device.

A detector 31 for determining the quality of the extracted water is mounted externally of the tubing portion 12 near the bottom of the separator 14, thus making it possible to check continuously the purity of the water which is reinjected into the reinjection zone 5 and if necessary to stop the operation of the regulator 27.

The different electric cables 32 for supplying electric power to the pump 15 and to the detectors of the device as well as the control lines 33 for the hydraulic regulators 27 and 28 are preferably grouped together within a duct 34 provided at its lower end with a packing-gland sell 35 and connected to the tubing string by means of a fastening clamp 36.

The operation of the device described in the foregoing is as follows:

The effluent from the production zone 4 flows into the well 1 through the perforated zone 6 in the manner indicated by the arrows in FIG. 1. The effluent is then drawn-up by the pump 15 which feeds the separator 14 via the pipes 17 and 18.

The energy delivered by the pump 15 is such as to permit reinjection of water into the reinjection zone and upward displacement of the oil within the tubing string 3. To this end, the highest pressure to be delivered is determined beforehand. A choice of localization of the reinjection zone also makes it possible to determine the value of pressure at which the water has to be reinjected. By way of example, this value is 100 bar. Moreover, if the oil column within the tubing string 3 is equivalent to a pressure of 80 bar, there will accordingly be selected a pump 15 which will deliver energy at a value higher than 100 bar in order to guarantee that the pressure required for reinjection of the water will be sufficient whilst the lower pressure required for upward displacement of oil within the tubing string 3 is also ensured.

Pressurization of the effluent within the separator 14 is continuously monitored by the detector 30 which makes it possible to modify the opening of the regulator 28 and to produce action on the operation of the pump 15 in the event of an increase in pressure within the separator 14 throughout the period of development and operation of the production zone, the physical conditions of which are liable to change in the course of time.

Separation of the water and oil is carried out by gravity within the separator. Thus the water which is heavier accumulates within the bottom portion of the separator whilst the oil which is lighter accumulates within the top portion of said separator. During the separation process, the hydraulic water-discharge regulator 27 is closed until the water reaches the maximum level within the separator and the oil discharge regulator 28 is opened so as to permit upward displacement of the oil to the surface and to maintain the pressure within the separator. Opening of the regulator 28 is a function of the respective rates of flow of water and oil within the corresponding pipes.

When the water level reaches the detector 25, this latter initiates opening of the regulator 27. The water is then sucked through the pipe 24, passes into the pipe 12 and is then reinjected through the pipe 11 and the perforations of the zone 7 into the reinjection zone 5.

The oil from the separator 14 passe through the perforations 29 of the pipe 22 and rises to the wellhead 9 through the tubing string 3.

Should the reinjected water fail to attain a sufficiently high quality standard, the detector 31 closes the regulator 27 and steps are accordingly taken by supervisory control personnel to improve the separation of components within the separator 14, for example by increasing the time of retention of effluent within the separator, especially by means of a reduction in pump output.

When the level of water within the separator reaches that of the detector 26, this latter closes the regulator 27 and the feed cycle for the supply of effluent to the separator 14 continues.

In an alternative embodiment shown in FIG. 3, the water reinjection zone is located above the production zone. The same elements as those of the device of FIG. 1 are designated by the same references.

In this alternative embodiment, the pipes for removal of water and oil are no longer located in the line of extension of each other but are displaced with respect to each other. Furthermore, the water quality detector 31 and the water discharge regulator 27 are placed within the separator 14.

Double packing seals are provided, namely a packing seal 40 between the separator 14 and the perforated section 7 in order to isolate the production zone from the reinjection zone and a packing seal 41 placed above the perforated section 7 in order to isolate that portion of the casing which is located above said perforated section 7.

The operation of the device is the same as that described with reference to FIG. 2.

It may happen that the space available within the casing 2 is limited and that it is consequently impossible to install the device in the manner shown in FIG. 2. Under these conditions, the device can be arranged as shown in FIG. 4. Tee water-removal pipe 11, 12 which is in the line of extension of the oil pipe 22 is placed in the axis of the pump 15 and coaxially with the casing 2. The feed pipe 17 is accordingly displaced to a slight extent in the lateral direction with respect to the axis of the pump 15. Suitable packing seals (such as the packing seal 43 shown in FIG. 4) are provided for ensuring leak-tightness of the pipe section 11.

The duct 34 terminates at a control unit 50. This control unit 50 includes a hydraulic pump 51 which discharges hydraulic oil under pressure and in a highly fluid state into a line 52 in which is placed a pressure accumulator 53. The line 52 supplies two electrovalves 54, 55. The electrovalve 54 is connected electrically to the detectors 25 and 26 and hydraulically to tee regulator 27. The electrovalve 55 is connected electrically to the detector 30 and hydraulically to the regulator 28. Each electrovalve is connected through a drainage line 56, 57 to an oil reservoir 58.

The electrovalves 54, 55 modify the oil pressure within the regulators 27 and 28 by deviating a fraction of the oil under pressure delivered by the pump 51 and the accumulator 53 va the drainage lines 56, 57. Thus the opening operations of the regulators 27 and 28 are continuously monitored from the ground surface.

Electric power supplies of the pump 51 and electrovalves 54 and 55 are brought in from an electric power source (not shown) via conductors 59, 60.

As will readily be apparent, the invention is not limited in any sense to the modes of execution of the example described in the foregoing with reference to the accompanying drawings. Depending on the applications which may be contemplated, many alternative embodiments within the capacity of those versed in the art may accordingly be considered without thereby departing either from the scope or the spirit of the invention.

Figure 7:
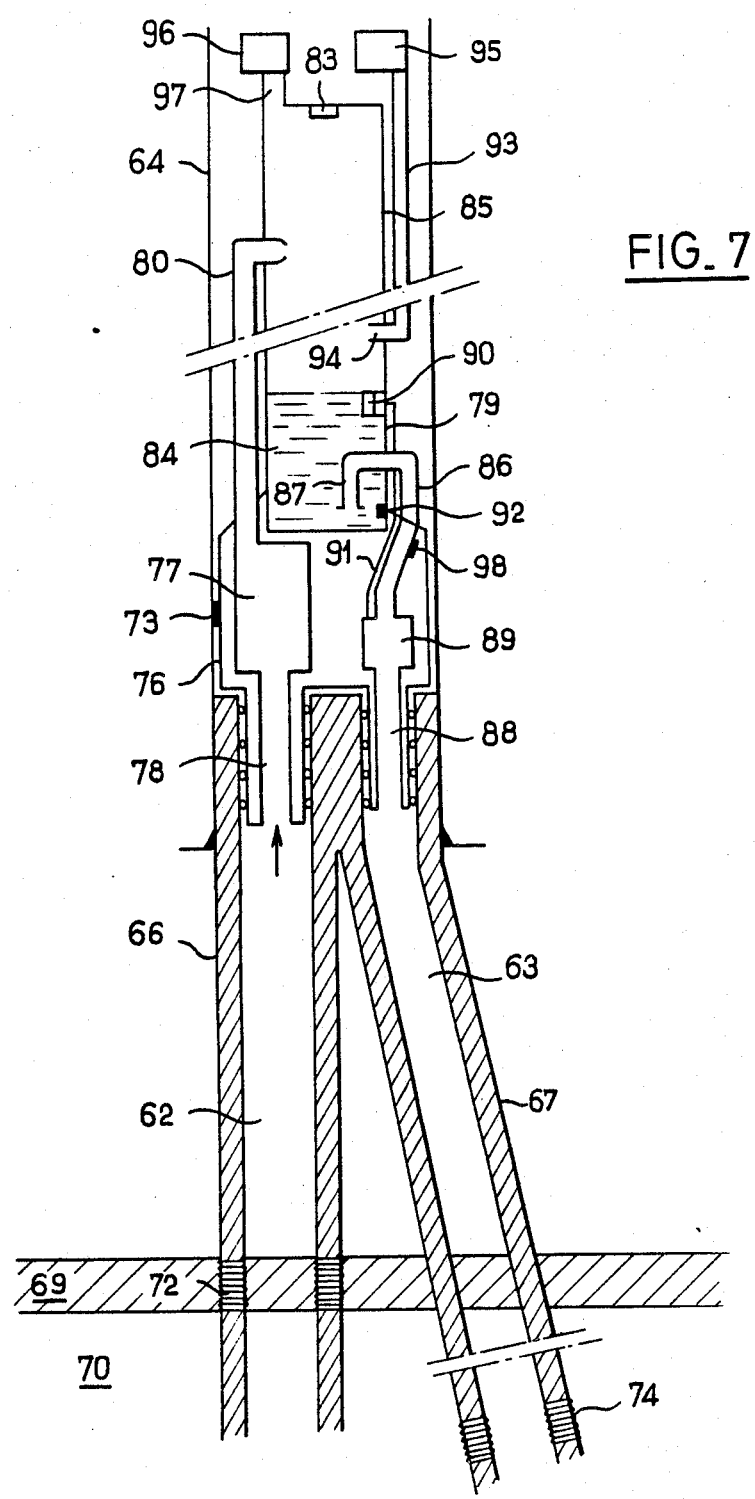
FIG. 7 is an enlarged schematic view showing the lower portion of the wellbore of FIG. 6.

The present invention can also be employed in multiple-completion wells having one or a number of lateral boreholes or branch flow strings (as shown in FIGS. 6 and 7).

In this case, the productive formations are traversed by a main wellbore 61 and by lateral boreholes, two of which are shown in the drawings and designated by the references 62 and 63. The casing string 64 is cemented in the main wellbore 61 and receives a production tubing string 65 for lifting and removal of the effluent. A casing string 66, 67 is also cemented within each of the lateral boreholes 62 and 63. When the casing strings 66 and 67 have been cemented, the casing 66 is perforated in the production zone 68 which is formed by an upper oil stratum 69 and a lower water stratum 70, the two strata 69 and 70 being separated by an interface which is materialized by a line 71. Preferably, the perforated zone 72 of the casing 66 is located above the interface 71 in order to prevent as far as possible any excessive upward displacement of the water from the stratum 70 into the wellbore. Positioning of the perforated zone 72 in this location is made possible by the characteristics of the production zone 68 which are determined by known methods of drilling and/or well-logging. The extent of said perforated zone and a method for determining the maximum level which can reach the interface 71 are described in U.S. Pat. No. 4,019,576.

Positioning of the branch casing strings with respect to each other and with respect to the main wellbore is obtained by means of a deflecting unit which is fixed in situ within the wellbore and by means of a coupling unit fitted with a guide spline 73. All these means are described and illustrated in French Pat. No. 83 13 981 and will therefore not be described further.

Perforations are formed in a zone 74 of the branch casing string 73, said zone being placed within the water-bearing stratum or aquifer 70 at a location such that reinjection of water in fact takes place within said stratum 70 but at a distance from the branch flow string 62 which is sufficient to ensure that the water cone which is formed between the strata 69 and 70 is not increased.

The effluent which is a mixture of oil from the stratum 69 and of water from the stratum 70 passes through the perforated zone 72 into the lateral borehole or branch flow string 62.

The device in accordance with the invention as illustrated in the drawings and generally designated by the reference 75 is placed within the main wellbore 61 above the lateral boreholes 62 and 63. A supporting and positioning unit 76 is provided within the device in order to position this latter correctly with respect to the branch flow string 62 which is in service. Accurate position-location is obtained by means of the guide spline 73 in the manner indicated in the French patent cited earlier. By means of an electric pump 77 which is rigidly fixed to the support 76, the effluent which is introduced into the branch flow string 62 is drawn-up through a suction duct 78 in order to supply effluent to a separator 79 (also rigidly fixed to the support 76) via a feed pipe 80.

Among the characteristics measured by the known methods mentioned earlier are those relating to the pressures developed within the different strata of the production zone. These characteristics serve to determine the energies which have to be produced in order to lift the oil to the wellhead 9 and to reinject water into the aquifer 70.

The pump 77 maintains the effluent under pressure within the separator 79, said pressure being continuously detected and measured by a detector 83 placed in the upper portion of the separator 79. The components of the effluent are separated from each other within the separator 79 under the action of gravity by reason of their different densities. The water 84 which is heavier accordingly accumulates in the bottom portion of the separator 79 and the oil 85 which is lighter accordingly accumulates in the top portion of said separator 79.

A water extraction pipe 86 has a goosenecked end portion 87 which dips in the water 84. The other end 88 of the pipe 86 opens into the branch flow string 63. A water discharge regulator 89 is mounted on the pipe 86 and is controlled in particular by a detector 90 for detecting the maximum level of water within the separator 79. An electric conductor 91 connects the regulator 89 to the detector 90. A detector 92 for detecting the minimum water level is mounted within the separator 79 and connected to the water discharge regulator 89.

An oil extraction pipe 93 opens at one end 94 into the separator 79 and is connected at the other end to the tubing string 65. An oil discharge regulator 95 is mounted on the pipe 93 and is connected to the detectors 90 and 92 by means of electric conductors which are not shown in the drawings.

A gas discharge regulator 96 may if necessary be mounted on a gas removal pipe, only a portion 97 of which is shown in FIG. 7.

A water-quality detector 98 is mounted outside the separator 79 and on the pipe 86 with a view to continuously monitoring the purity of the water which is reinjected into the aquifer 70 and if necessary stopping the operation of the regulator 89.

The different electric conductors which are not shown in the drawings except for the conductor 91 but which are necessary for supplying electric current to the pump 77 and/or for transmitting control orders to the different electrically operated elements could preferably be grouped together in the form of a bundle protected by a fluid-tight sheath which extends upwards to the wellhead 9.

The operation of the device described in the foregoing is as follows:

The effluent from the production zone 68 passes into the branch flow string 62 through the perforated zone 72. The effluent is then drawn up by the pump 77 which supplies the separator 79 through the feed pipe 80.

The energy delivered by the pump 77 is such as to permit reinjection of water into the reinjection zone and upward displacement of the oil within the tubing string 65. To this end, the highest pressure to be delivered is determined beforehand. A choice of localization of the reinjection zone also makes it possible to determine the pressure at which the water has to be reinjected and which may have a value of 100 bar, for example. Moreover, if the oil column within the tubing string 65 is equivalent to a pressure of 80 bar, there will accordingly be chosen a pump 77 which will deliver energy equivalent to more than 100 bar in order to guarantee that the pressure required for reinjection of water will be sufficient whilst the lower pressure which is necessary for lifting the oil within the tubing string 65 is also ensured.

Pressurization of the effluent within the separator 79 is continuously monitored by the detector 83 and makes it possible to modify the energy delivered by the pump 77 throughout the life of the production zone, the physical conditions of which are subject to change in the course of time.

Separation of the water and oil is carried out by gravity within the separator. Thus the water which is the heavier component accumulates in the bottom portion of the separator and the oil which is the lighter component accordingly accumulates in the top portion. During the separation process, the hydraulic water-discharge regulator 89 and the oil discharge regulator 95 are closed.

When the water level reaches the detector 90, this latter initiates opening of the regulators 89 and 95. The water is then drawn-up through the goosenecked pipe end 87, flows into the pipe 86 and is then introduced into the branch flow string 63 before being reinjected into the aquifer 70 through the perforated zone 74.

The oil from the separator 79 passes into the pipe 93 and flows up to the wellhead 81 through the tubing string 65.

Should the reinjected water fail to meet the requisite quality standard, the detector 98 closes the regulators 89 and 95 and steps are then taken by supervisory control personnel to improve the separation of components within the separator 79, for example by permitting opening of the regulators 89 and 95 only after a longer period of time has elapsed, even if the water reaches the detector 90.

When the water level within the separator reaches that of the detector 92, this latter closes the regulators 89 and 95 and the feed cycle for the supply of effluent to the separator 79 begins again.

By making a judicious choice of the location for reinjection of water and as a function of the geometry of the production zone 68, it can be ensured that reinjection of the water into the aquifer 70 produces a lateral thrust within the oil stratum 69.

What is claimed is:

1. A device for separating and extracting components having different densities from an effluent which is available in a production zone of an oil well, the wellbore being provided with a casing string which is perforated at the level of the production zone and with a tubing string, said device being of the type comprising means for separating said components under the action of gravity, extraction means for withdrawal of the heavier-density component, means for reinjecting the extracted component into a reinjection zone through perforations formed in the wellbore casing, means for displacing the lower-density component up to a wellhead, wherein the separating means are constituted by a closed-unit separator housed within the well and wherein said device includes a single pump for drawing-up the effluent after admission into the casing and bringing said effluent into said separator within which the components of said effluent are separated under the action of gravity, the pressure maintained within said separator by said pump being higher than the highest value which is necessary for extracting one of the components, at least one regulator having the function of regulating the delivery of the lower-density component being mounted within an extraction pipe for withdrawal of said component and at least one regulator having the function of regulating the delivery of the other component being mounted within an extraction pipe for withdrawal of said other component.

2. A device according to claim 1, wherein reinjection of the higher-density component is carried out through a reinjection branch casing which is different from another branch casing into which said effluent is introduced.

3. A device according to claim 1, wherein the extraction pipes for withdrawal of components are constituted by a single pipe which passes through said separator, the opening of one end of said pipe being located in proximity to the perforated zone and the other end of said pipe being joined to the wellbore tubing.

4. A device according to claim 1, wherein said device further comprises high-level and low-level detectors for the higher-density component.

5. A device according to claim 3, wherein the single pipe is provided with a plug for separating the components from each other within said single pipe.

6. A device according to claim 1, wherein said device further comprises at least one detector for checking the quality of one of the extracted components.

7. A device according to claim 1, wherein said device further comprises a detector for detecting the internal pressure of the separator.

8. A device according to claim 1, wherein the extraction pipe for withdrawal of the lower-density component is provided with orifices for establishing a communication between the interior of the separator and the interior of said extraction pipe.

9. A device according to claim 1, wherein the separator is placed between the production zone and the reinjection zone.

10. A device according to claim 1, wherein the reinjection zone is located above the production zone and wherein the extraction pipes are separate from each other and placed within said separator, packing seals being mounted within the casing on each side of the perforated portion through which the higher-density component is reinjected.

11. A device according to claim 1, wherein the extraction pipes for withdrawal of components extend through the pump along the axis of said pump.

12. A device according to claim 1, wherein said device includes a control unit and an oil reservoir which supplies through a pump at least two electrovalves for controlling the water and oil regulators.

13. A device according to claim 12, wherein each electrovalve is connected to the oil reservoir via a drainage line.

14. A device according to claim 2, wherein the reinjection branch casing has a perforated portion placed in a water stratum which is included in the production zone and is located beneath a productive oil stratum.

15. A device according to claim 2, wherein the reinjection branch casing opens into a different reinjection zone located beneath the production zone.

* * * * *

UNITED STATES PATENT AND TRADEMARK OFFICE
CERTIFICATE OF CORRECTION

PATENT NO. : 4,793,408
DATED : December 27, 1988
INVENTOR(S) : Hubert MIFFRE

It is certified that error appears in the above-identified patent and that said Letters Patent is hereby corrected as shown below:

On the Title Page, Item [73],
the Assignee's name has been erroneously indicated as "Societe Nationale Elf Aquitaine" when it should be --Societe Nationale Elf Aquitaine (Production)--.

Signed and Sealed this

Seventeenth Day of October, 1989

Attest:

DONALD J. QUIGG

Attesting Officer

Commissioner of Patents and Trademarks